(12) United States Patent
Thomason

(10) Patent No.: US 11,779,008 B2
(45) Date of Patent: Oct. 10, 2023

(54) GAME ANIMAL FIELD DRESSING DEVICE

(71) Applicant: Tom Thomason, Waterford, NY (US)

(72) Inventor: Tom Thomason, Waterford, NY (US)

( * ) Notice: Subject to any disclaimer, the term of this patent is extended or adjusted under 35 U.S.C. 154(b) by 134 days.

(21) Appl. No.: 17/576,353

(22) Filed: Jan. 14, 2022

(65) Prior Publication Data

US 2022/0248661 A1 Aug. 11, 2022

Related U.S. Application Data

(60) Provisional application No. 63/148,166, filed on Feb. 11, 2021.

(51) Int. Cl.
*A01M 31/00* (2006.01)
*A22C 17/02* (2006.01)

(52) U.S. Cl.
CPC ............. *A01M 31/00* (2013.01); *A22C 17/02* (2013.01)

(58) Field of Classification Search
CPC ........... A01M 31/00; A22C 17/02; A22B 5/06
USPC ............ 452/187–192; 294/81.1, 81.2, 81.21, 294/81.3, 67.4, 74
See application file for complete search history.

(56) References Cited

U.S. PATENT DOCUMENTS

| | | | | |
|---|---|---|---|---|
| 5,951,080 A | * | 9/1999 | Wessner | F16G 11/06 294/153 |
| 7,222,903 B2 | * | 5/2007 | Tardiff | B66C 1/10 294/74 |
| 7,341,506 B1 | * | 3/2008 | Hogue | A22B 5/06 452/189 |
| 7,896,416 B2 | * | 3/2011 | Carter | A01M 31/006 294/146 |
| 8,282,450 B2 | * | 10/2012 | Carbaugh | A22B 5/06 452/197 |
| 9,616,601 B2 | * | 4/2017 | Meissner | B30B 11/08 |
| 2009/0233535 A1 | * | 9/2009 | Boduch | A01M 31/006 452/187 |

* cited by examiner

*Primary Examiner* — Richard T Price, Jr.
(74) *Attorney, Agent, or Firm* — Brennan, Manna & Diamond, LLC

(57) ABSTRACT

The present invention relates to a game animal field dressing and gutting assistance tool. The tool is used for holding the legs of a game animal open while the hunter dresses and guts the animal. The tool comprises a telescoping pole that can be adjusted and selectively-affixed in length for use with different game animals. The telescoping pole includes two ends, each end having a strap assembly housing a strap and a lock for securing the strap. The straps can be connected to the animal's legs and the telescoping pole can be selectively-affixed in length to enable a hunter to spread the legs of the game animal to a desired distance. The straps and pole keep the legs open while the hunter dresses and guts the animal.

20 Claims, 6 Drawing Sheets

GAME ANIMAL FIELD DRESSING DEVICE

CROSS-REFERENCE TO RELATED APPLICATION

The present application claims priority to, and the benefit of, U.S. Provisional Application No. 63/148,166, which was filed on Feb. 11, 2021 and is incorporated herein by reference in its entirety.

FIELD OF THE INVENTION

The present invention relates generally to the field of portable tools and accessories for hunters. More specifically, the present invention relates to a game animal field dressing and gutting assistance tool. The tool comprises a telescoping pole that can be adjusted in length for use with different game animals and for use with game animals of different sizes. The tool further comprising a pair of strap assemblies, each having a strap and a lock, for securing the strap. The straps are connected to the animal's legs, enabling users to adjust the telescopic portion(s) to spread the legs to a desired length or distance therebetween. The straps and pole keep the legs open while the hunter dresses and guts the animal. Users can transport the device with ease, held around the waist or another desired area. Accordingly, the present disclosure makes specific reference thereto. Nonetheless, it is to be appreciated that aspects of the present invention are also equally applicable to other like applications, devices and methods of manufacture.

BACKGROUND

By way of background, field dressing and gutting are performed to immediately remove the entrails and the feed from a game animal before transporting the meat to a site for final cleaning, refrigeration, or processing. This prevents spread of bacteria and prevent the spoilage of meat. Removal of viscera from a dead game animal is referred to as evisceration or, more commonly, gutting. Bacterial growth occurs rapidly in the internal organs or viscera of the dead game animal, and thus gutting the animal promptly is critical. The field dressing and the gutting are necessary steps in processing and preserving meat from animals harvested in the wild. They must be done as soon as possible after killing the game animal in order to ensure rapid body heat loss and prevention of bacteria growth on the surface of the carcass.

Individuals, especially hunters, would agree that dressing and gutting are extremely difficult processes and require holding the hind legs of the game animal open during the process. It becomes difficult and nearly impossible for a single person to spread and hold the hind legs open while performing field dressing and gutting and thus require multiple individuals for the process. A single person may tie each leg to a tree using ropes for spreading the hind legs, which is inconvenient and not always possible. For bigger animals, a rope and pulley may be used. Further, while holding the legs of the game animal, individuals may end up injuring themselves due to uncontrollable or inadvertent movement of the animal while a sharp knife is employed to cut the game's hide and flesh to accomplish the evisceration/gutting.

Therefore, there exists a long felt need in the art for a game animal gutting device that can be used for holding and spreading the legs of a game animal. There is also a long felt need in the art for a field dressing device that eliminates the use of ropes for spreading legs of a game animal. Additionally, there is a long felt need in the art for a field dressing device that can be used for a variety of game animals. Moreover, there is a long felt need in the art for a gutting device that enables a single person to perform field dressing and gutting without help from another. Furthermore, there is a long felt need in the art for a field dressing device that prevents injury to hunters while field dressing the game animal. Finally, there is a long felt need in the art for a dressing and gutting device that makes the field dressing and gutting process quick and less exhausting for hunters.

The subject matter disclosed and claimed herein, in one embodiment thereof, comprises a multipurpose dressing assistance tool for holding open legs of a hunted animal for field dressing and gutting. The multipurpose tool features a telescopic handle having a first end and a second end, the handle having a plurality of telescoping sections for adjusting the length of the handle, a first strap assembly attached to the first end, and a second strap assembly attached to the second end. Each strap assembly includes a strap selectively lockable in a loop for forming a loop to secure around a hind leg of the game animal. The straps keep the hind legs of a game animal open and separated while a hunter dresses and guts the game animal. The length can be adjusted to support game animals of different sizes so that legs can be held apart and upright.

In this manner, the field dressing and gutting device of the present invention accomplishes all of the forgoing objectives and provides users with a telescoping pole device for holding legs of a game animal open and stable. The device eliminates the need for users to hold the legs of the animal while performing field dressing and can be adjusted and used for any game animal. Further, the device is portable and can be carried easily and prevents users from getting injured as the hind legs of the animal remain static and the animal remains controllable.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a multipurpose tool for holding the legs of a hunted animal open and separated for field dressing. The multipurpose tool holds open the legs of a game animal for easy and efficient field dressing. The multipurpose tool further comprises a telescoping handle having a first end and a second end, the handle having a plurality of telescoping sections for adjusting a length of the handle, a first strap assembly attached to the first end, and a second strap assembly attached to the second end. Each strap assembly can include a strap selectively lockable in a loop for forming a loop to secure around a hind leg of the game animal. The straps keep the telescoping handle or pole secured between the hind legs of a game animal while a hunter dresses and guts the game animal.

In yet another embodiment, a game field dressing assistance tool is disclosed. The tool includes a pair of straps wherein the straps are attached to opposite ends of a telescopic handle or telescoping pole, the handle can be adjusted between a maximum length and a minimum length wherein the distance between the straps is maximum when the handle includes the maximum length and the distance between the straps is minimum when the handle includes the minimum length. The straps can be rolled in a roller and can be unrolled to increase a length of the strap for securing around legs of varying sizes associated with various hunted game animals.

In yet another embodiment of the present invention, a method for holding open the legs of a harvested game animal using a field dressing assistance device disclosed. The method includes the steps of initially securing a first leg of the game animal in a first strap of the device, securing a second leg of the game animal in a second strap of the device, and thereafter adjusting the length of a telescoping handle or pole for securely spreading the legs of the game animal to a desired length such that the straps and handle keep the legs open while the hunter dresses and guts the animal.

In yet another embodiment, the straps are placed in strap assemblies wherein each strap includes a free end that can be pulled to unroll the strap from the roller and locked using a lock for creating a loop to secure to the leg of an animal.

In yet another embodiment, the telescopic handle includes three telescoping sections that are rotated or twisted relative to each other for extending or retracting the length of the telescoping pole/handle.

In yet another embodiment, the tool of the present invention is a one-piece tool that is compact, versatile and rugged. The tool incorporates a combination of telescoping sections and strap assemblies that can be employed to efficiently assist with field dressing game. The invention provides for improved elements thereof in an arrangement for the purposes described that are inexpensive, dependable and fully effective in accomplishing their intended purposes.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
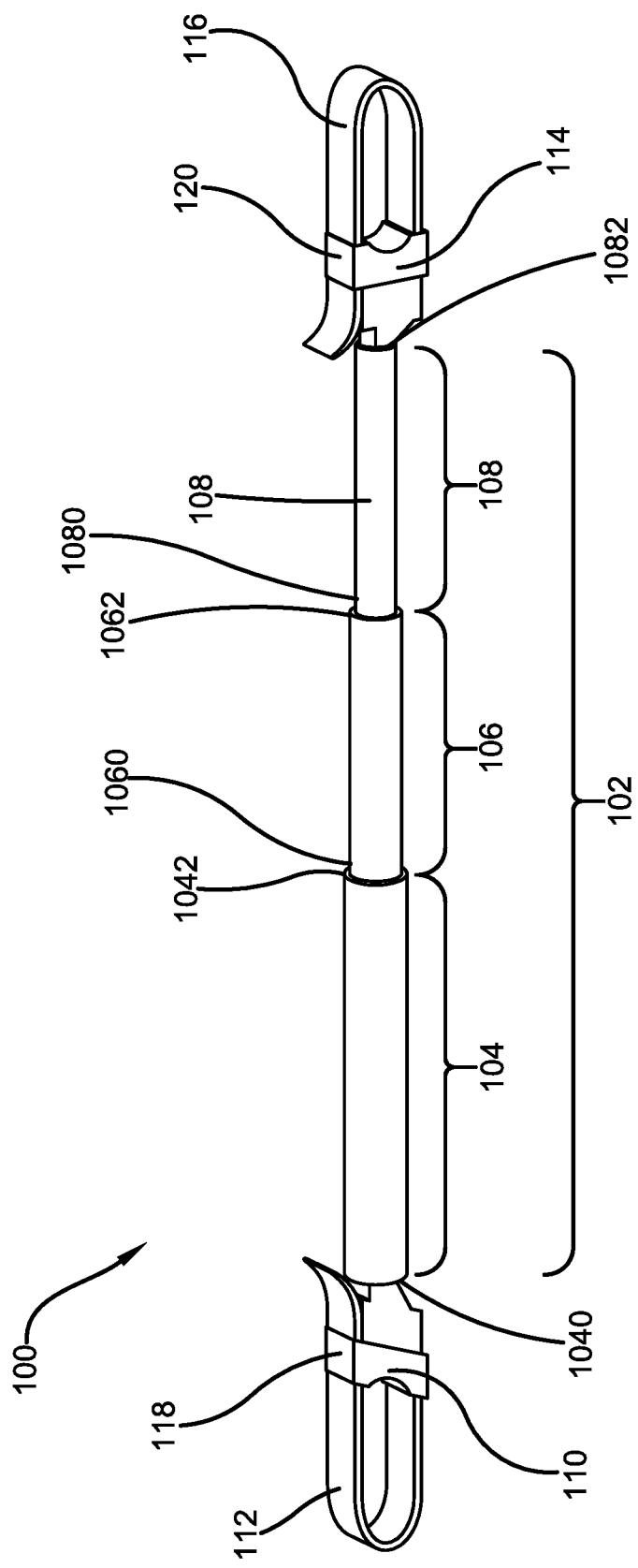
FIG. 1 illustrates a perspective view of one potential embodiment of a telescoping field dressing device of the present invention for game animals in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long felt need in the art for a game animal gutting device that can be used for holding and spreading the legs of a game animal. There is also a long felt need in the art for a field dressing device that eliminates the use of ropes for spreading legs of a game animal. Additionally, there is a long felt need in the art for a field dressing device that can be used for a variety of game animals. Moreover, there is a long felt need in the art for a gutting device that enables a single person to perform field dressing and gutting without help from another. Furthermore, there is a long felt need in the art for a field dressing device that prevents injury to hunters while field dressing the game animal. Finally, there is a long felt need in the art for a dressing and gutting device that makes the field dressing and gutting process quick and less exhausting for hunters.

The present invention, in one exemplary embodiment, includes a game field dressing assistance tool. The tool includes a pair of straps wherein the straps are attached to opposite ends of a telescopic handle, the handle can be adjusted between a maximum length and a minimum length, wherein the distance between the straps is maximum when the handle includes the maximum length and the distance between the straps is minimum when the handle includes the minimum length. The straps can be rolled in a roller and can be unrolled to increase a length of the strap for securing around the legs of various hunted game animals.

Referring initially to the drawings, FIG. 1 illustrates a perspective view of one potential embodiment of a telescoping field dressing device 100 of the present invention for game animals in accordance with the disclosed architecture. The dressing device 100 of the present invention is a multipurpose tool for dressing a deer or other game animals while hunting and especially for holding the legs secured and opened while performing the field dressing of the game animal. More specifically, the dressing tool 100 includes a telescoping pole or handle 102 that includes a plurality of telescoping sections 104, 106, 108. The telescoping sections 104, 106, 108 are configured to extend and retract to change the length of the pole 102, and thus enable the device 100 to be used for securing the hind legs of different types and sizes of game animals.

The first telescoping section 104 includes a first end 1040 and a second end 1042. Similarly, the second telescoping section 106 includes a first end 1060 and a second end 1062, and the third telescoping section 108 includes a first end 1080 and a second end 1082. The first end 1040 of the first telescoping section 104 and the second end 1082 of the third telescoping section 108 form the two extreme ends of the pole 102. The first end 1040 of the first telescoping section 104 includes a first strap assembly 110 having a first strap 112 for securing to a first hind leg of a game animal. The second end 1082 of the third telescoping section 108 includes a second strap assembly 114, having a second strap 116 for securing to a second hind leg of a game animal. The first strap assembly 110 includes a first lock 118 for locking the strap 112 to a desired length, and the second strap assembly 114 includes a second lock 120 for locking the second strap 116 to a desired length. The functionality of the locks 118, 120 are best described in FIG. 3.

For extending and retracting a length of the telescoping pole 102, the telescoping sections 104, 106, 108 can move in extended and retracted orientations. In the extended position, the distance between the first strap assembly 110 and the second strap assembly 114 increases; and, in the retracted position, the distance between the first strap assembly 110 and the second strap assembly 114 decreases.

The telescoping sections 104, 106, 108 enable and prevent longitudinal displacement of the sections relative to each other. Preferably, the telescoping sections have cam elements that enable the relative movements and selective affixing of sections 104, 106, 108 when one of the sections is rotated or twisted relative to the other sections.

In one potential embodiment, the length of the telescoping pole 102 can retract to a length of about two feet and can extend to a length of about six feet. The device 100 can come in a variety of colors and is sturdy and durable to withstand rough handling. The straps 112, 116 are used for looping around the legs of the game animal such that a user does not have to manually hold the legs for spreading and can perform field dressing and gutting independently using both hands, without needing the assistance of another person. The straps 112, 116 can also be used for securing the dressing device 100 on a waistbelt or any other desired area for easy portability when not in use.

Figure 2:
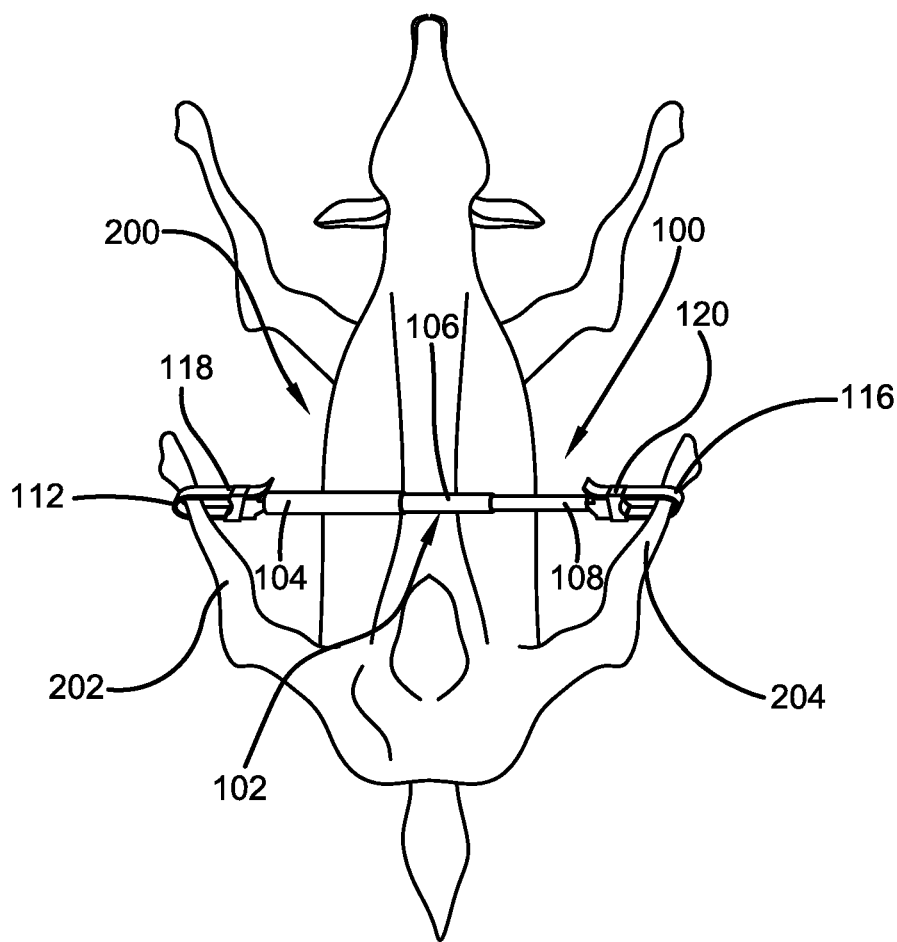
FIG. 2 illustrates a top perspective view showing the use of one potential embodiment of a game animal hind legs spreading device for holding and spreading the legs of a game animal in accordance with the disclosed architecture.

FIG. 2 illustrates a top perspective view showing the use of the game animal hind legs spreading device 100 for holding the spread legs of a game animal in accordance with the disclosed architecture. For performing field dressing and gutting of the game animal 200, the telescoping pole 102 is extended to a desired length. In use, the first strap 112 is secured to the first hind leg 202 of the game animal 200 using the first lock 118. The first strap 112 forms a loop around the hind leg 202 and similarly, the second strap 116 is secured around the second leg 204 of the game animal 200 using the second lock 120. A user, such as a hunter, can first secure the first strap 112 to the first leg 202 of the animal 200, and then the length of the telescoping pole 102 can be adjusted and affixed. The device 100 when secured to both the legs of the game animal 200, keeps the hind legs 202, 204 in an open position, thereby eliminating the need of the user to hold open the hind legs 202, 204 and thus can focus and perform the gutting and dressing process using both hands.

Figure 3:
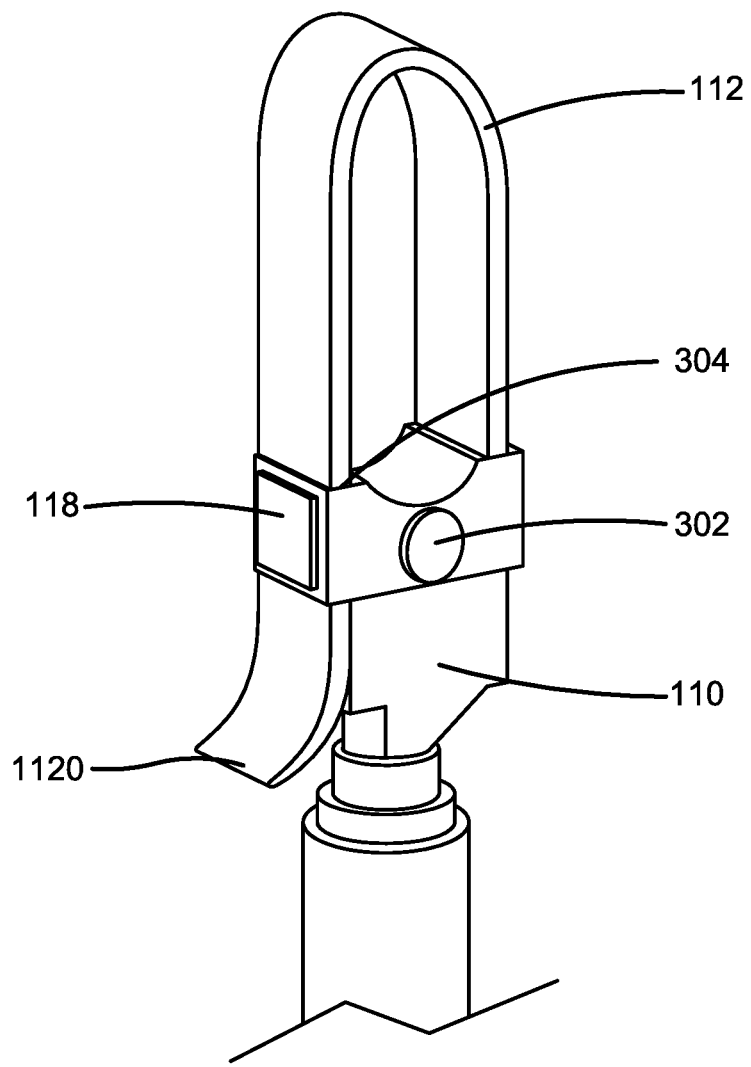
FIG. 3 illustrates a close-up view of one potential embodiment of a first assembly used for securing a first strap around a hind leg of a game animal in accordance with the disclosed architecture.

FIG. 3 illustrates an enlarged view of the first assembly 110 used for securing the first strap 112 around a hind leg of a game animal in accordance with the disclosed architecture. It should be noted that the present embodiment is described considering the first assembly 110 as an example, however, the same functionality is deployed for the second assembly 114. The first strap assembly 110 includes a built-in roller 302 on which the strap 112 is releasably rolled. The strap 112 includes a free end 1120 that can be held by a user and pulled for unrolling the length of the strap 112 from the roller 302. When the free end 1120 is pulled, the roller 302 rotates in a counter-clockwise direction to release the strap 112. The free end 1120 of the strap 112 is passed through an opening 304 of the first lock 118, such that the strap 112 forms a loop that can be secured to the leg of a game animal. When a desired length of the strap 112 is pulled, the strap 112 is fastened using the lock 118. The lock 118 secures the length and prohibits any further movement of the strap 112 through the lock 118.

Figure 4:
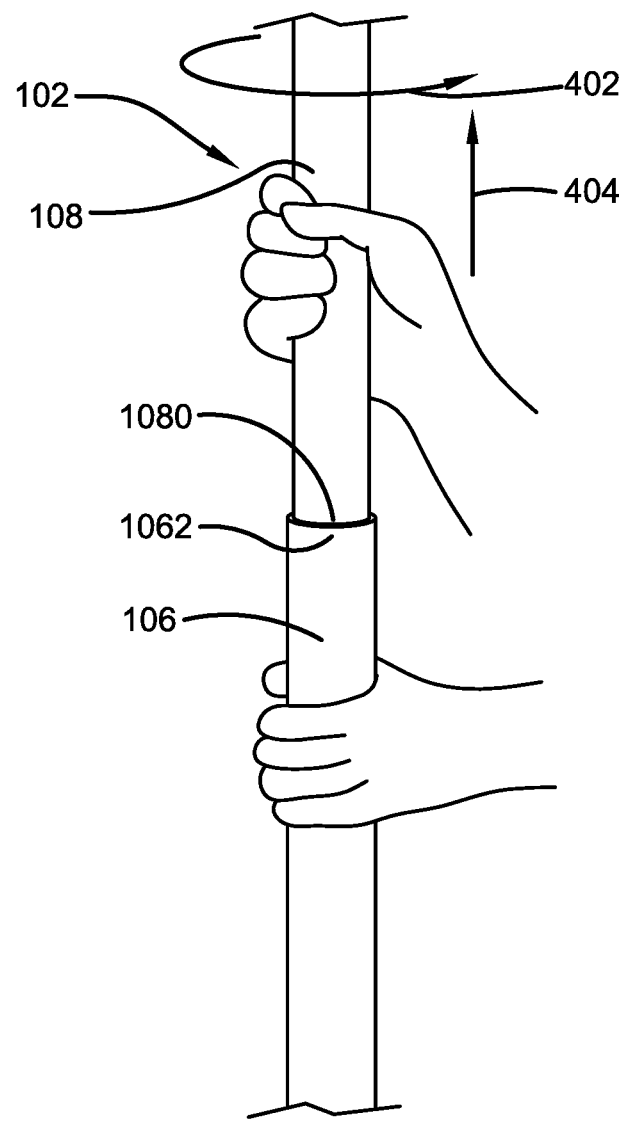
FIG. 4 illustrates a perspective view showing an exemplary method of extending the length of the telescoping pole showing extension of a second telescoping section and a third telescoping section of one potential embodiment of the multi-purpose tool of the present invention in accordance with the disclosed architecture.

FIG. 4 illustrates a perspective view showing an exemplary method of extending the length of the telescoping pole or handle 102 showing an extension of the second telescopic section 106 and third telescopic section 108 of the extendable dressing device 100 of the present invention in accordance with the disclosed architecture. For extending and affixing the length of the pole 102, the telescoping sections can be untwisted and twisted relative to each other. As shown, the third telescoping section 108 is rotated in counter-clockwise direction 402, thereby enabling the section 108 to extend 404 from the second end 1062 of the second telescoping section 106. At the maximum length, the first end 1080 of the third telescoping section 108 abuts with the second end 1062 of the second telescoping section 106 to prevent the second telescoping section 106 from separating from the third telescoping section 108.

Figure 5:
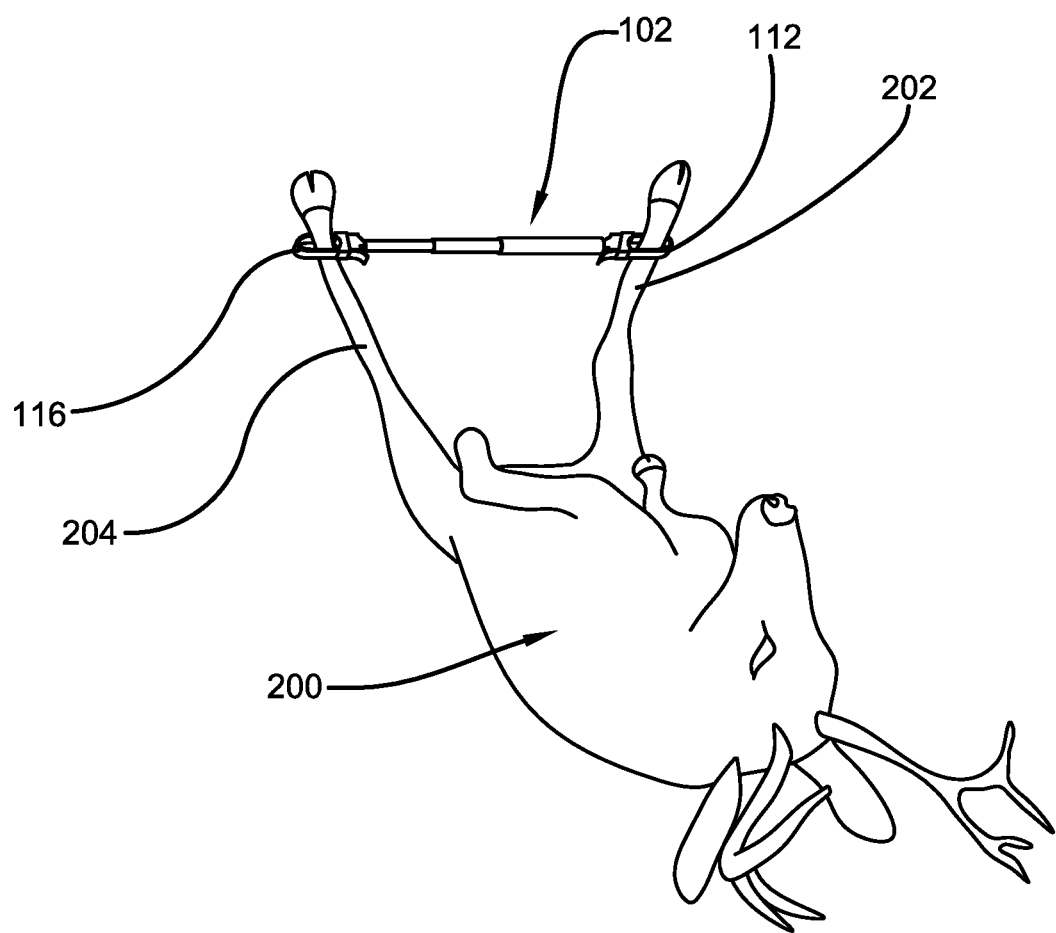
FIG. 5 illustrates a perspective view showing the open hind legs of the game animal being held by one potential embodiment of the field dressing assistance device of the present invention in accordance with the disclosed architecture.

FIG. 5 illustrates a perspective view showing the open hind legs of the game animal being held by the field dressing assistance device 100 of the present invention in accordance with the disclosed architecture. The first strap 112 secures the first hind leg 202 and the second strap 116 secures the second hind leg 204 of the game animal 200. The legs 202, 204 are secured in a spread and open position with the telescoping pole 102 adjusted to the desired length of the leg opening of the game animal 200. The present invention obviates the need of using ropes and also prohibits the legs of a hunted game animal 200 from falling while field dressing, thus making the field dressing process smoother and quicker without reducing injuries to the hunter or field dresser.

Figure 6:
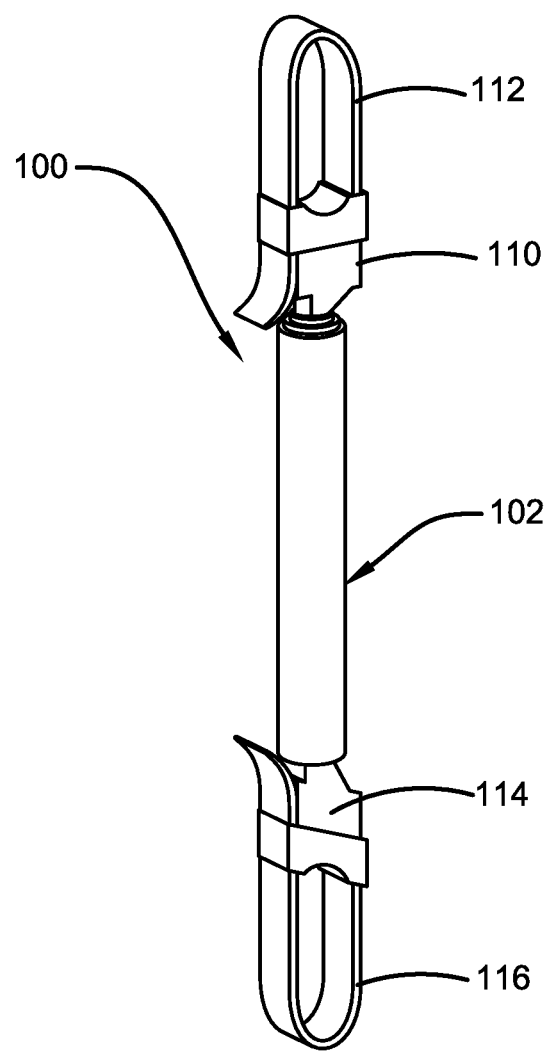
FIG. 6 illustrates a perspective view showing one potential embodiment of the telescopic field dressing device of the present invention in retracted form in accordance with the disclosed architecture.

FIG. 6 illustrates a perspective view showing the telescopic field dressing device 100 of the present invention in retracted form in accordance with the disclosed architecture. For shortening the length of the pole or handle 102, the telescoping sections 104, 106, 108 are retracted to telescope into each other enabling the length of the pole to be roughly one-third of the maximum extended length of the pole 102. The retracted length is useful for the smaller game animals such as deer of smaller sizes.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "telescoping field dressing device", "game animal hind legs spreading device", "multi-purpose tool", "field dressing assistance device", "field dressing tool" and "device" are interchangeable and refer to the game animal's hind legs spreading and holding device 100 of the present invention.

Notwithstanding the forgoing, the game animal's hind legs spreading and holding device 100 of the present invention can be of any suitable size and configuration as is known in the art without affecting the overall concept of the invention, provided that it accomplishes the above-stated objectives. One of ordinary skill in the art will appreciate that the size, configuration and material of the game animal hind legs spreading and holding device 100 as shown in the FIGS. are for illustrative purposes only, and that many other sizes and shapes of the game animal's hind legs spreading and holding device 100 are well within the scope of the present disclosure. Although the dimensions of the game animal's hind legs spreading and holding device 100 are important design parameters for user convenience, the game animal's hind legs spreading and holding device 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A field dressing device for use with a game animal, the field dressing device comprising:
    a telescoping pole comprising a plurality of telescoping sections, a first terminal end and a second terminal end;
    wherein said plurality of telescoping sections are configured to extend and retract to selectively affix a length of said telescoping pole;
    wherein said first terminal end comprises a first strap assembly having a first adjustable strap for securing to a first hind leg of the game animal;
    wherein said second terminal end comprises a second strap assembly having a second adjustable strap for securing to a second hind leg of the game animal;
    wherein said first strap assembly comprises a first lock for locking said first adjustable strap to a desired length; and
    further wherein said second strap assembly comprises a second lock for locking said second adjustable strap to a desired length.

2. The field dressing device of claim 1, wherein said plurality of telescoping sections comprises a first telescoping section, a second telescoping section and a third telescoping section.

3. The field dressing device of claim 2, wherein a first end of said first telescoping section comprises the first terminal end of the telescoping pole, and a second end of the third telescoping section comprises the second terminal end of the telescoping pole.

4. The field dressing device of claim 1, wherein the length of the telescoping pole is extendable from about 2 feet to about 6 feet.

5. The field dressing device of claim 1, wherein said telescoping pole comprises an extended length and a retracted length, and further wherein said retracted length is generally about one-third of said extended length.

6. A field dressing device for use with a game animal, the field dressing device comprising:
    a telescoping pole comprising a plurality of telescoping sections, a first terminal end and a second terminal end;
    wherein said plurality of telescoping sections are configured to extend and retract to selectively affix a length of said telescoping pole;
    wherein said first terminal end comprises a first strap assembly having a first adjustable strap for securing to a first hind leg of the game animal;
    wherein said second terminal end comprises a second strap assembly having a second adjustable strap for securing to a second hind leg of the game animal;
    wherein said first strap assembly comprises a first lock for locking said first adjustable strap to a desired first length;
    wherein said second strap assembly comprises a second lock for locking said second adjustable strap to a desired second length; and
    further wherein said plurality of telescoping sections comprise a first telescoping section and a second telescoping section.

7. The field dressing device of claim 6 further comprising a third telescoping section.

8. The field dressing device of claim 7, wherein the length of the telescoping pole is extendable from about 2 feet to about 6 feet.

9. The field dressing device of claim 7, wherein a first end of said first telescoping section comprises the first terminal end of the telescoping pole, and a second end of the third telescoping section comprises the second terminal end of the telescoping pole.

10. The field dressing device of claim 6, wherein said telescoping pole comprises an extended length and a retracted length, and further wherein said retracted length is generally about one-third of said extended length.

11. The field dressing device of claim 6, wherein said first strap assembly comprises a built-in first roller on which said first adjustable strap is releasably rolled.

12. The field dressing device of claim 6, wherein said second strap assembly comprises a built-in second roller on which said second adjustable strap is releasably rolled.

13. A field dressing device for use with a game animal, the field dressing device comprising:
    a telescoping pole comprising a plurality of telescoping sections, a first terminal end and a second terminal end;

wherein said plurality of telescoping sections are configured to extend and retract to selectively affix a length of said pole;

wherein said first terminal end comprises a first strap assembly having a first adjustable strap for securing to a first hind leg of the game animal;

wherein said second terminal end comprises a second strap assembly having a second adjustable strap for securing to a second hind leg of the game animal;

wherein said first strap assembly comprises a first lock for locking said first adjustable strap to a desired first length;

wherein said second strap assembly comprises a second lock for locking said second adjustable strap to a desired second length;

wherein said plurality of telescoping sections comprise a first telescoping section, a second telescoping section and a third telescoping section;

wherein said telescoping pole comprises an extended length and a retracted length; and further wherein said retracted length is generally about one-third of said extended length.

14. The field dressing device for game animals of claim 13, wherein the length of the telescoping pole can range from about 2 feet to about 6 feet.

15. The field dressing device for game animals of claim 14, wherein said first strap assembly comprises a built-in first roller on which said first adjustable strap is releasably rolled.

16. The field dressing device for game animals of claim 15, wherein said second strap assembly comprises a built-in second roller on which said second adjustable strap is releasably rolled.

17. The field dressing device for game animals of claim 16, wherein said first adjustable strap comprises a free end for unrolling said desired first length of said first adjustable strap from said first roller.

18. The field dressing device for game animals of claim 17, wherein said second adjustable strap comprises a free end for unrolling said desired second length of said second adjustable strap from said second roller.

19. The field dressing device for game animals of claim 18, wherein said first lock comprises an opening for passing said free end of said first adjustable strap therethrough for forming a first strap loop for securing to the first hind leg of the game animal.

20. The field dressing device for game animals of claim 19, wherein said second lock comprises an opening for passing said free end of said second adjustable strap therethrough for forming a second strap loop for securing to the second hind leg of the game animal.

* * * * *